(12) United States Patent
Sowul et al.

(10) Patent No.: US 7,101,298 B2
(45) Date of Patent: Sep. 5, 2006

(54) ELECTRIC VARIABLE TRANSMISSION WITH DE-COUPLED ENGINE CHARGING IN REVERSE

(75) Inventors: Henryk Sowul, Novi, MI (US); James D. Hendrickson, Belleville, MI (US); Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 156 days.

(21) Appl. No.: 10/946,760

(22) Filed: Sep. 22, 2004

(65) Prior Publication Data

US 2006/0063628 A1   Mar. 23, 2006

(51) Int. Cl.
*F16H 3/72*   (2006.01)
(52) U.S. Cl. .......................................... 475/5
(58) Field of Classification Search ................... 475/5; 477/3
See application file for complete search history.

(56) References Cited

U.S. PATENT DOCUMENTS

| | | | |
|---|---|---|---|
| 5,009,301 A | 4/1991 | Spitler | 192/106.2 |
| 5,558,589 A | 9/1996 | Schmidt | 475/5 |
| 5,931,757 A | 8/1999 | Schmidt | 475/2 |
| 6,090,005 A * | 7/2000 | Schmidt et al. | 475/5 |
| 6,358,173 B1 * | 3/2002 | Klemen et al. | 475/5 |
| 6,551,208 B1 * | 4/2003 | Holmes et al. | 475/5 |
| 6,953,409 B1 * | 10/2005 | Schmidt et al. | 475/5 |

* cited by examiner

*Primary Examiner*—Dirk Wright
(74) *Attorney, Agent, or Firm*—Christopher DeVries

(57) ABSTRACT

A hybrid electromechanical transmission includes first, second and third planetary gear sets, an input member, an output member, and first and second motor generators. At least one of the gear members in the first planetary gear set is connected to the first motor/generator. At least one of the gear members in the third planetary gear set is connected to the second motor/generator. First and second interconnecting members continuously connect members of the first planetary gear set with members of the second planetary gear set. Five torque-transmitting mechanisms selectively interconnect members of the planetary gear sets with a stationary member or with other members of the planetary gear sets. One of the five torque-transmitting mechanisms is operative to selectively disconnect the second planetary gear set from the third planetary gear set so that the second motor/generator may drive the output member while disconnected from the first motor/generator and the input member.

23 Claims, 2 Drawing Sheets

ELECTRIC VARIABLE TRANSMISSION WITH DE-COUPLED ENGINE CHARGING IN REVERSE

TECHNICAL FIELD

The present invention relates to a hybrid electro-mechanical vehicular transmission that utilizes three interactive planetary gear sets that are operatively connected to an engine and two motor/generators, and includes five clutches, wherein one clutch is operable to selectively de-couple the engine and one motor/generator from the other motor/generator.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

A series propulsion system is a system in which energy follows a path from an engine to an electric storage device and then to an electrical motor which applies power to rotate the drive members. There is no direct mechanical connection between the engine and the drive members in a series propulsion system.

Transmissions adapted to receive the output power from either an engine or an electric motor, or both, have heretofore relied largely on what has been designated as series, hybrid propulsion systems. Such systems are designed with auxiliary power units (APUs) of relatively low power for minimum emissions and best fuel economy. However, such combinations of small APUs and even large energy storage devices do not accommodate high-average power vehicles or address duty cycles that demand continuous, constant speed operation. Steep grades and sustained high-average cruising speeds at desired high efficiencies are not achievable with a typical, series, hybrid transmission configuration.

The challenge, therefore, is to provide a power system that will operate at high efficiencies over a wide variety of operating conditions. Desirable electric variable transmissions should leverage the benefits of a series, hybrid transmission for desirable low-average power duty cycles—i.e., low speed start/stop duty cycles—as well as the benefits of a parallel hybrid transmission for high-average output power, high speed duty cycles. In a parallel arrangement the power supplied by the engine and the power supplied by the source of electrical energy are independently connected to the drive members.

Moreover, perfecting a concept wherein two modes, or two integrated power split gear trains, with either mode available for synchronous selection by the on-board computer to transmit power from the engine and/or the motor/generator to the output shaft results in a hybrid transmission having an extremely wide range of applications.

The desired beneficial results may be accomplished by the use of a variable, two-mode, input and compound split, parallel hybrid electro-mechanical transmission. Such a transmission utilizes an input member to receive power from the vehicle engine and a power output member to deliver power to drive the vehicle. First and second motor/generator power controllers are connected to an energy storage device, such as a batter pack, so that the energy storage devices can accept power from, and supply power to, the first and second motor/generators. A control unit regulates power flow among the energy storage devices and the motor/generators as well as between the first and second motor/generators.

A variable, two-mode, input-split, parallel, hybrid electro-mechanical transmission also employs at least one planetary gear set. The planetary gear set has an inner gear member and an outer gear member, each of which meshingly engages a plurality of planet gear members. The input member is operatively connected to one of the gear members in the planetary gear set, and means are provided operatively to connect the power output member to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque transfer devices. Heretofore, in one mode the output speed of the transmission is generally proportional to the speed of one motor/generator, and in the second mode the output speed of the transmission is generally proportional to the speed of the other motor/generator.

In some embodiments of the variable, two-mode, input-split, parallel, hybrid electro-mechanical transmission, a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

With reference, again, to a simple planetary gear set, the planet gear members are normally supported for rotation on a carrier that is itself rotatable. When the sun gear is held stationary and power is applied to the ring gear, the planet gear members rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

U.S. Pat. No. 5,558,589, which issued on Sep. 24, 1996 to General Motors Corporation and is hereby incorporated by reference, teaches a variable, two-mode, input-split, parallel, hybrid electro-mechanical transmission wherein a "mechanical point" exists in the first mode and two mechanical points exist in the second mode. U.S. Pat. No. 5,931,757, which issued on Aug. 3, 1999 to General Motors Corporation and is hereby incorporated by reference, teaches a two-mode, compound-split, electro-mechanical transmission with one mechanical point in the first mode and two mechanical points in the second mode.

A mechanical point occurs when either of the motor/generators is stationary at any time during operation of the transmission in either the first or second mode. The lack of a mechanical point is a drawback inasmuch as the maximum mechanical efficiency in the transfer of power from the engine to the output occurs when one of the motor/generators is at a mechanical point, i.e., stationary. In variable, two-mode, input-split, parallel, hybrid electro-mechanical transmissions, however, there is typically one point in the second mode at which one of the motor/generators is not rotating such that all the engine power is transferred mechanically to the output.

The two-mode, compound-split, electromechanical transmission referenced above is an efficient option for commercial-duty vehicles, such as transient buses and the like, which regularly operate at close to their maximum capacity. When the transmission is operating in electric mode and the engine is not running, the motor/generator driving the vehicle must also rotate the engine, which results in parasitic losses.

SUMMARY OF THE INVENTION

The present invention provides a hybrid electro-mechanical transmission which is particularly useful in personal trucks, wherein the typical load is less than half of maximum capacity. The novel transmission uses five clutches, one of which is operable to selectively de-couple the engine and one motor/generator from the other motor/generator. It enables one motor/generator to drive the vehicle while decoupled from the other motor/generator and the engine. Further, when the one motor/generator is driving the vehicle in reverse, the engine may drive the other motor/generator which may transmit power to the one motor/generator to assist in driving the vehicle (i.e., permitting de-coupled engine charging in reverse).

It is an object of the present invention to provide a novel hybrid electro-mechanical transmission, as above, wherein the planetary gear sets and the motor/generators are coaxially disposed.

It is a further object of the present invention to provide a novel transmission, as above, wherein the planetary gear sets are disposed radially inwardly of the annularly configured motor/generators to minimize the envelope—i.e., at least the circumferential dimension—of the transmission.

It is still another object of the present invention to provide a novel transmission, as above, wherein the operational results can be achieved with three simple planetary gear sets.

It is an even further object of the present invention to provide a novel transmission, as above, wherein the transmission is operated by five torque transfer devices.

By way of a general introductory description, a two-mode, compound-split, electro-mechanical transmission embodying the concepts of the present invention utilizes an input member for receiving power from a prime mover power source and an output member for delivering power from the transmission. The subject transmission employs three planetary gear sets which are coaxially aligned. Each planetary gear set utilizes first, second and third gear members. First and second motor/generators are operatively connected to an energy storage device for interchanging electrical power between the storage device and the first and second motor/generators. A control unit is provided for regulating the electrical power interchange between a energy storage device and the first and second motor/generators. The control unit also regulates electrical power interchange between the first and second motor/generators.

The first and second motor/generators are coaxially aligned with each other as well as the three planetary gear sets which are circumscribed by the first and second motor/generators.

The invention will be described with reference to one particular arrangement of planetary gear sets, fixed interconnections and torque-transmitting mechanisms. However, the invention is not limited to this particular embodiment, which is described merely as a preferred embodiment.

At least one of the gear members in the first or second planetary gear sets is connected to the first motor/generator. At least one of the gear members in the third planetary gear set is connected to the second motor/generator. One of the gear members of the first planetary gear set is continuously connected to one of the gear members in the second planetary gear set. Another of the gear members of the first planetary gear set is continuously connected to another one of the gear members in the second planetary gear set. One of the members of the first or second planetary gear set is operatively connected to the input member. One of the members of the third planetary gear set is operatively connected to the output member.

A first torque-transmitting mechanism selectively connects one of the gear members of the third planetary gear set with ground. A second torque-transmitting mechanism selectively connects one of the gear members associated with each of the first, second and third planetary gear sets to each other and to the output member. A third torque-transmitting mechanism selectively connects one of the gear members of the second planetary gear set with ground. A fourth torque-transmitting mechanism selectively connects one of the gear members with another of the gear members. A fifth torque-transmitting mechanism selectively connects one of the gear members of the second planetary gear set with one of the gear members of the third planetary gear set.

The fifth torque-transmitting mechanism selectively disconnects the second planetary gear set from the third planetary gear set so that the second motor/generator may drive the output member while disconnected from the first motor/generator and the engine. The engine assists by driving the first motor/generator, which acts as a generator, to charge the battery, which transfers energy to the second motor/generator for driving the output member in a reverse speed ratio. This allows the size of the second motor/generator to be minimized, reduces the packaging envelope, reduces cost and mass, and reduces energy consumption in reverse because the second motor/generator does not fight the engine (it is disconnected from the engine by the fifth torque-transmitting mechanism).

The above features and advantages and other features and advantages of the present invention are readily apparent from the following detailed description of the best modes for carrying out the invention when taken in connection with the accompanying drawings

DESCRIPTION OF THE PREFERRED EMBODIMENTS

Figure 1:
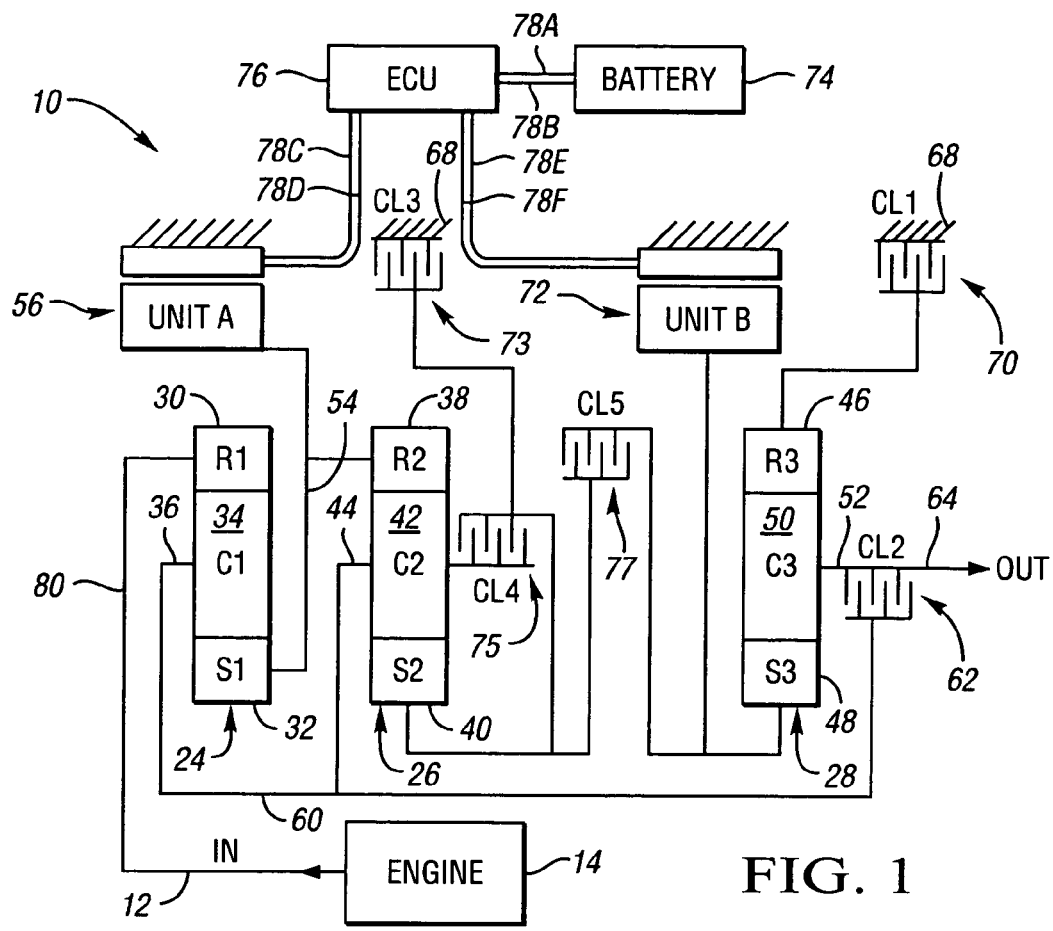
FIG. 1 is a schematic stick diagram of a two-mode, compound-split, electromechanical transmission embodying the concepts of the present invention.

One representative form of a two-mode, compound-split, electro-mechanical transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper may be incorporated between the engine 14 and the input member 12 of the hybrid transmission 10. An example of a transient torque damper of the type recommended for the present usage is disclosed in detail in U.S. Pat. No. 5,009,301, which issued on Apr. 23, 1991 to General Motors Corporation and is hereby incorporated by reference in its entirety. The transient torque damper may incorporate, or be employed in conjunction with, a torque transfer device to permit selective engagement of the engine 14 with the hybrid transmission 10, but it must be understood that the torque transfer device is not utilized to change, or control, the mode in which the hybrid transmission 10 operates.

In the embodiment depicted, the engine 14 may be a fossil fuel engine, such as a diesel engine which is readily adapted to provide its available power output delivered at a constant number of revolutions per minute (RPM). In the exemplary embodiment, the engine 14 can—after start-up, and during the majority of its input—operate at a range of speeds from approximately 600 to approximately 6000 RPM. Although it must be understood that the speed and horsepower output of the engine 14 is not critical to the invention, for the purpose of effecting a clear understanding of the hybrid transmission 10, an available output of about 305 horsepower from engine 14 will be assumed for the description of an exemplary installation. Irrespective of the means by which the engine 14 is connected to the input member 12 of the transmission 10, the input member 12 is connected to a planetary gear set 24 in the transmission 10.

The hybrid transmission 10 utilizes three planetary gear sets 24, 26 and 28. The first planetary gear set 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear set 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear set 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48. A sample gear arrangement is shown in copending U.S. Ser. No. 10/851,351 filed May 21, 2004, commonly assigned with the present application, and hereby incorporated by reference in its entirety.

While all three planetary gear sets 24, 26 and 28 are "simple" planetary gear sets in their own right, the first and second planetary gear sets 24 and 26 are compounded in that the inner gear member 32 of the first planetary gear set 24 is conjoined, as through a hub plate gear (or first interconnecting member) 54, to the outer gear member 38 of the second planetary gear set 26. The conjoined inner gear member 32 of the first planetary gear set 24 and the outer gear member 38 of the second planetary gear set 26 are continuously connected to a first motor/generator 56.

The planetary gear sets 24 and 26 are further compounded in that the carrier 36 of the first planetary gear set 24 is conjoined, as through a shaft (or second interconnecting member) 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device (or second torque-transmitting mechanism) 62 which, as will be hereinafter more fully explained, is employed to assist in the selection of the operational modes of the hybrid transmission 10.

The carrier 52 of the third planetary gear set 28 is connected directly to the transmission output member 64. When the hybrid transmission 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The outer gear member 46 of the third planetary gear set 28 is selectively connected to ground, represented by the transmission housing 68, through a torque transfer device 70. Torque transfer device (or first torque-transmitting mechanism) 70, as is also hereinafter explained, is also employed to assist in the selection of the operational modes of the hybrid transmission 10. The sun gear 48 is continuously connected to a second motor/generator 72. All the planetary gear sets 24, 26 and 28 as well as the two motor/generators 56 and 72 are coaxially oriented, as about the axially disposed shaft 60. It should be noted that both motor/generators 56 and 72 are of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope—i.e., the circumferential dimension—of the transmission 10 is minimized.

A torque transfer device (or third torque-transmitting mechanism) 73 selectively connects the sun gear 40 with ground (i.e., with transmission housing 68). A torque transfer device (or fourth torque-transmitting mechanism) 75 is operative as a lock-up clutch, locking planetary gear sets 24, 26, motor 56, and the input 12 to rotate as a group, by selectively connecting the sun gear 40 with the carrier 44. A torque transfer devide (or fifth torque-transmitting mechanism) 77 selectively connects the sun gear 40 with sun gear 48. The torque transfer devices 62, 70, 73, 75 and 77 are all friction clutches.

As was previously herein explained in conjunction with the description of the engine 14, it must similarly be understood that the rotational speed and horsepower output of the first and second motor/generators 56 and 72 are also not critical to the invention, but for the purpose of effecting an absolutely clear understanding of the hybrid transmission 10, the motors/generators 56 and 72 have a continuous rating of approximately 40% of engine torque and a maximum speed of about 12000 RPM. The continuous power rating is approximately ⅓ that of the engine 14, and the maximum speed is approximately 1.5× that of the engine 14, although these depend on the type of engine, final gear ratio and duty cycle.

As should be apparent from the foregoing description, and with particular reference to FIG. 1, the transmission 10 selectively receives power from the engine 14. As will now be explained, the hybrid transmission also receives power from an electric storage device 74. The electric storage device 74 may be one or more batteries. Other electric storage devices that have the ability to store electric power and dispense electric power may be used in place of the batteries without altering the concepts of the present invention. As was explained in conjunction with the description of the engine 14 and the motor/generators 56 and 72, it must similarly be understood that the horsepower output of the electrical storage device 74 is also not critical to the invention, but for the purpose of effecting an absolutely clear understanding of the hybrid transmission 10 an output of about 75 horsepower from the electrical storage device 74 will be assumed for description of an exemplary device. The battery pack is sized depending on regenerative requirements, regional issues such as grade and temperature, and propulsion requirements such as emissions, power assist and electric range.

The electric storage device 74 communicates with an electrical control unit (ECU) 76 by transfer conductors 78A and 78B. The ECU 76 communicates with the first motor/generator 56 by transfer conductors 78C and 78D, and the ECU 76 similarly communicates with the second motor/generator 72 by transfer conductors 78E and 78F.

As is apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 78, but the specific, individual transfer conductors are, therefore, identified as 78A, 78B, 78C, 78D, 78E and 78F in the specification and on the drawings. This same suffix convention shall be employed throughout the specification.

The clutch 77 is operative to selectively disconnect the mechanical path between the motor/generators 56 and 72 so that the motor/generator 72 need not fight against mechanical torque delivered by the engine, in addition to propelling the vehicle when in reverse. By enabling the mechanical path between the motor/generator 72 and the engine 14 to be disconnected, the clutch 77 eliminates electric machine-engine fighting and reduces the required torque level of the motor/generator 72 by approximately 40%. During "engine charging in reverse" operation, engine power is used to drive the motor/generator 56, which works as a generator to provide power to the battery 74, and/or directly to the motor/generator 72, to power the motor/generator 72. Accordingly, the motor/generator 72 may drive the vehicle in reverse while disconnected from the engine 14, and need not fight against engine torque, and, in fact, is assisted by engine power via the motor/generator 56 acting as a generator.

Accordingly, the clutch 77 provides engine-to-output decoupling, and also allows effective "battery only reverse" wherein the motor/generator 72 may drive the vehicle in reverse using power from the battery 74 when the engine is not running, which is convenient for a commercial vehicle operating in emission sensitive environments. When operating in electric mode with the clutch 77 opened, torque from the motor/generator 72 is used exclusively to propel the vehicle. Without clutch 77 being available, a percentage of the torque from the motor/generator 72 must also be used to rotate upstream powertrain components, which would contribute to parasitic losses.

During engine starting, clutch 73 (or clutch 75) is locked, and all other clutches are opened. For "decoupled engine charging in reverse," clutch 73 (or clutch 75) and clutch 70 are locked, and all other clutches are opened. For "battery only reverse" operation, clutch 70 is locked, and all other clutches are opened.

Figure 2:
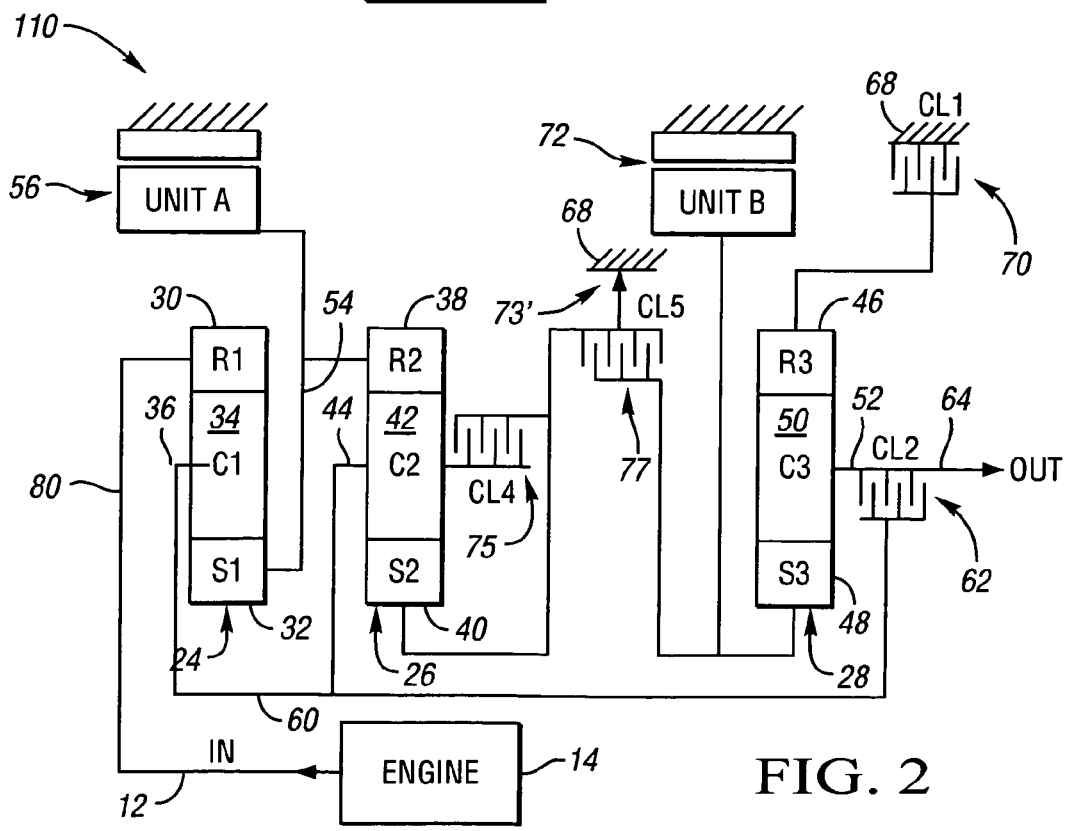
FIG. 2 is a schematic stick diagram of a two-mode, compound split, electromechanical transmission in accordance with an alternative embodiment of the invention wherein the third torque-transmitting mechanism is a one-way clutch.

Turning to FIG. 2, a schematic stick diagram is shown for a two mode, compound split, electro-mechanical transmission in accordance with an alternative embodiment of the invention. In FIG. 2, like reference numerals are used to identify like components from FIG. 1. The transmission architecture illustrated in FIG. 2 is identical to that of FIG. 1, except that the braking clutch 73 of FIG. 1 has been replaced with the one-way clutch 73' in FIG. 2. The one-way clutch 73' is smaller and more easily packaged that the friction clutch 73 of FIG. 1.

Figure 3:
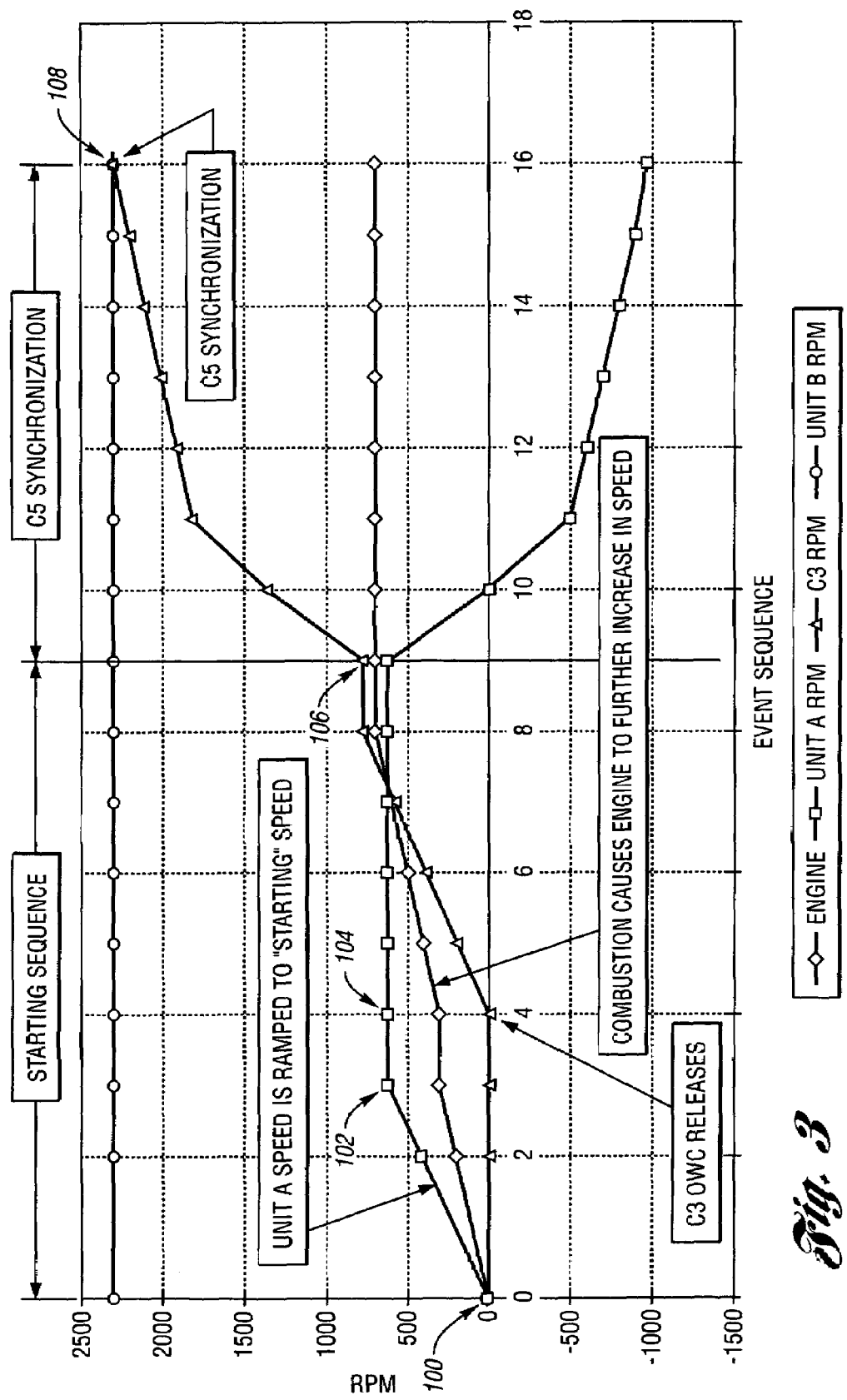
FIG. 3 is a graphical representation of the rotations per minute (RPM) of the motor/generators, the engine and the third torque-transmitting mechanism vs. time during a starting sequence for a transmission corresponding with FIG. 2.

The one-way clutch 73' provides a starting reaction, which will self-release as the engine starts. This one-way clutch provides potential for a very smooth engine start using motor/generator 56 while motor/generator 72 simultaneously drives the vehicle. For engine starting, the one-way clutch 73' holds, and all other clutches are opened. Accordingly, the input is disconnected from the output. This allows the motor/generator 72 to be dedicated to driving the vehicle in electric mode. In general, motor/generator 72 power is directed through the sun gear 48 and carrier 52 when clutch 70 is engaged. The speed of the motor/generator 72 is then a direct proportion to the vehicle speed, and the required power is provided by the energy supplied from the electrical supply system (i.e., the battery 74). The motor/generator 56 is at zero speed when the engine is off. The controls determine at which point the engine should be restarted to supply power. This starting event sequence is shown graphically in FIG. 3, which illustrates how to seamlessly start the engine when the vehicle is rolling. FIG. 3 shows four plot lines corresponding with the legend on the bottom, including engine speed, Unit A (motor/generator 56) speed, C3 (clutch 73') speed, and Unit B (motor/generator 72) speed.

In this sequence, the motor/generator 72 is connected to the output to drive the vehicle. As shown, the motor/generator 72 begins the sequence operating at approximately 2300 RPM, and the motor/generator 56 is at rest. The speed of the motor/generator 56 is initially ramped up to a starting speed of approximately 600 RPM between points 100 and 102. The motor/generator 56 speed is maintained at this level to provide engine clean combustion and to stay below the engine idle speed. At point 104, the engine is fired, which reverses the input torque and provides a reverse in power flow. The sun gear 40 reaction is reversed upon combustion driven power reversal, and the one-way clutch 73' is released. As shown, this combustion causes the engine speed to increase. At point 106, the controller commands the motor/generator 56 to decrease its speed which increases the speed of the sun gear 40. This sun gear 40 speed is then increased until it equals the speed of the sun gear 48 at point 108. At this point, the speeds of the sun gears 40 and 48 have been synchronized with the motor/generator 72, and the clutch 77 is locked. After this point, the clutch 77 remains locked, and the transmission 110 may be operated in a manner, such as that described in the four clutch configuration of U.S. Provisional Ser. No. 60/531,528, filed Dec. 19, 2003, assigned to the assignee of the present invention and hereby incorporated by reference in its entirety.

For "decoupled engine charging in reverse," the clutches 70 and 75 are locked, and all other clutches are opened. For "battery only reverse," the clutch 70 is locked, and all other clutches are opened.

Accordingly, the advantages of adding this additional clutch 77 include eliminating the motor/generator 72 fighting the engine 14 when in reverse mode, allowing motor size reductions, packaging reduction, machine cost and mass reduction, and reducing energy consumption in "battery only reverse" mode because the motor/generator 72 does not fight the engine. This also increases reverse grade capability and allows smooth engine starting using one motor, while the other motor simultaneously drives the vehicle.

While the best modes for carrying out the invention have been described in detail, those familiar with the art to which this invention relates will recognize various alternative designs and embodiments for practicing the invention within the scope of the appended claims.

The invention claimed is:

1. A two-mode compound split hybrid electro-mechanical transmission, comprising:
   first and second motor/generators;
   first, second and third planetary gear sets, each planetary gear set utilizing first, second and third gear members;
   said first and second motor/generators being coaxially aligned with each other and with said three planetary gear sets;
   at least one of said gear members in said first or second planetary gear set being connected to said first motor/generator;
   at least one of said gear members in said third planetary gear set being connected to said second motor/generator;
   a first torque-transmitting mechanism selectively connecting one of said gear members of said third planetary gear set with ground;
   a second torque-transmitting mechanism selectively connecting one of said gear members associated with each of said first, second and third planetary gear sets to each other and to said output member;
   a third torque-transmitting mechanism selectively connecting one of said gear members of said second planetary gear set with ground;
   a fourth torque-transmitting mechanism selectively connecting one of said gear members with another of said gear members;
   a fifth torque-transmitting mechanism selectively connecting one of said gear members of said second planetary gear set with one of said gear members of said third planetary gear set;
   a first interconnecting member continuously connecting one of said gear members of said first planetary gear set with one of said gear members of said second planetary gear set; and
   a second interconnecting member continuously connecting another one of said gear members of said first planetary gear set with another one of said gear members of said second planetary gear set.

2. An electro-mechanical transmission, as set forth in claim 1, wherein said first, second and third gear members of each planetary gear set comprise a ring gear, carrier and sun gear, respectively, and said first interconnecting member continuously interconnects said carrier of said first planetary gear set with said carrier of said second planetary gear set.

3. An electro-mechanical transmission, as set forth in claim 2, wherein said second interconnecting member continuously interconnects said sun gear of said first planetary gear set with said ring gear of said second planetary gear set.

4. An electro-mechanical transmission, as set forth in claim 2, wherein said first torque-transmitting mechanism selectively connects said ring gear of said third torque-transmitting mechanism with ground.

5. An electro-mechanical transmission, as set forth in claim 2, wherein said second torque-transmitting mechanism selectively connects said carriers of said first and second planetary gear set with said carrier of said third planetary gear set and said output member.

6. An electro-mechanical transmission, as set forth in claim 2, wherein said third torque-transmitting mechanism selectively connects said sun gear of said second planetary gear set with ground.

7. An electro-mechanical transmission, as set forth in claim 2, wherein said fourth torque-transmitting mechanism selectively connects said carrier of said second planetary gear set with said sun gear of said second planetary gear set.

8. An electro-mechanical transmission, as set forth in claim 2, wherein said fifth torque-transmitting mechanism selectively connects said sun gear of said second planetary gear set with said sun gear of said third planetary gear set.

9. An electro-mechanical transmission, as set forth in claim 2, wherein said sun gear of said first planetary gear set is continuously connected with said first motor/generator, and said sun gear of said third planetary gear set is continuously connected with said second motor/generator.

10. An electro-mechanical transmission, as set forth in claim 2, wherein said ring gear of said first planetary gear set is connected with an input member.

11. An electro-mechanical transmission, as set forth in claim 2, wherein said carrier of said third planetary gear set is continuously connected with an output member.

12. An electro-mechanical transmission, as set forth in claim 2, wherein said third torque-transmitting mechanism comprises a one-way clutch.

13. A hybrid electro-mechanical transmission, comprising:
first, second and third planetary gear sets, each planetary gear set utilizing first, second and third gear members;
an input member connected to a gear member of said first planetary gear set;
an output member connected to a gear member of said third planetary gear set;
first and second motor/generators;
at least one of said gear members in said second planetary gear set being connected to said first motor/generator;
at least one of said gear members in said third planetary gear set being connected to said second motor/generator;
a first interconnecting member continuously connecting one of said members of said first planetary gear set with one of said members of said second planetary gear set;
a second interconnecting member continuously connecting another one of said members of said first planetary gear set with another one of said members of said second planetary gear set; and
five torque-transmitting mechanisms for selectively interconnecting said members of said planetary gear sets with a stationary member or with other members of said planetary gear sets, wherein one of said five torque-transmitting mechanisms is operative to selectively disconnect said second planetary gear set from said third planetary gear set so that said second motor/generator may drive said output member while disconnected from said first motor/generator and said input member.

14. An electro-mechanical transmission, as set forth in claim 13, wherein said first, second and third gear members of each planetary gear set comprise a ring gear, carrier and sun gear, respectively, and said first interconnecting member continuously interconnects said carrier of said first planetary gear set with said carrier of said second planetary gear set.

15. An electro-mechanical transmission, as set forth in claim 14, wherein said second interconnecting member continuously interconnects said sun gear of said first planetary gear set with said ring gear of said second planetary gear set.

16. An electro-mechanical transmission, as set forth in claim 14, wherein said five torque-transmitting mechanisms comprise first, second, third, fourth and fifth torque-transmitting mechanisms, wherein said first torque-transmitting mechanism selectively connects said ring gear of said third planetary gear set with ground, said second torque-transmitting mechanism selectively connects said carriers of said first and second planetary gear set with said carrier of said third planetary gear set and said output member, said third torque-transmitting mechanism selectively connects said sun gear of said second planetary gear set with ground, said fourth torque-transmitting mechanism selectively connects said carrier of said second planetary gear set with said sun gear of said second planetary gear set, and said fifth torque-transmitting mechanism selectively connects said sun gear of said second planetary gear set with said sun gear of said third planetary gear set.

17. An electro-mechanical transmission, as set forth in claim 14, wherein said sun gear of said first planetary gear set is continuously connected with said first motor/generator, and said sun gear of said third planetary gear set is continuously connected with said second motor/generator.

18. An electro-mechanical transmission, as set forth in claim 14, wherein said ring gear of said first planetary gear set is connected with an input member.

19. An electro-mechanical transmission, as set forth in claim 14, wherein said carrier of said third planetary gear set is continuously connected with an output member.

20. An electro-mechanical transmission, as set forth in claim 13, wherein said one of said five torque-transmitting mechanisms comprises a one-way clutch.

21. A two-mode compound split hybrid electro-mechanical transmission, comprising:
an input member for receiving power from an engine;
an output member for delivering power from the transmission;
first and second motor/generators;
an energy storage device for interchanging electrical power with said first and second motor/generators;
three coaxially aligned planetary gear members including first, second and third planetary gear sets, each planetary gear set including a sun gear member, a ring gear member and a planet carrier assembly member rotatably supporting a plurality of planet gears;
said first and second motor/generators being coaxially aligned with each other and with said three planetary gear sets;
said ring gear of said first planetary gear set being continuously connected with said input member;
said ring gear of said second planetary gear set being continuously connected with said first motor/generator and said sun gear of said first planetary gear set;
said sun gear of the said third planetary gear set being continuously connected to said second motor/generator;
said ring gear of said third planetary gear set being selectively connected to ground;
said planet carrier assembly member of said third planetary gear set being continuously connected to said output member;
said planet carrier assembly members of said first and second planetary gear sets being selectively connected to said planet carrier assembly of said third planetary gear set;
said sun gear of said second planetary gear set being selectively connected to ground;
said planet carrier assembly member of said second planetary gear set being selectively connected with said sun gear of said second planetary gear set; and
said sun gear of said second planetary gear set being selectively connected to said sun gear of said third planetary gear set.

22. The electro-mechanical transmission set forth in claim 21, wherein said sun gear of said second planetary gear set is selectively connected to ground through a one-way clutch.

23. A powertrain comprising:
first, second and third planetary gear sets, each planetary gear set utilizing first, second and third gear members;
an input member connected to an engine and to a gear member of said first or second planetary gear set;
an output member connected to an engine and to a gear member of said third planetary gear set;
first and second motor/generators operatively connected to a battery;
at least one of said gear members in said second planetary gear set being connected to said first motor/generator operatively connected to a battery;
at least one of said gear members in said third planetary gear set being connected to said second motor/generator operatively connected to a battery;

a first interconnecting member continuously connecting one of said members of said first planetary gear set with one of said members of said second planetary gear set;

a second interconnecting member continuously connecting another one of said members of said first planetary gear set with another one of said members of said second planetary gear set; and five torque-transmitting mechanisms for selectively interconnecting said members of said planetary gear sets with a stationary member or with other members of said planetary gear sets, wherein one of said five torque-transmitting mechanisms is operative to selectively disconnect said second planetary gear set from said third planetary gear set so that said second motor/generator may drive said output member while said engine assists by driving said first motor/generator to charge said battery to assist said second motor/generator in driving said output member in a reverse speed ratio.

* * * * *